Sept. 13, 1932.   L. LIPPARD   1,876,985
BATTERY CHARGING SYSTEM
Filed May 9, 1928   2 Sheets-Sheet 1
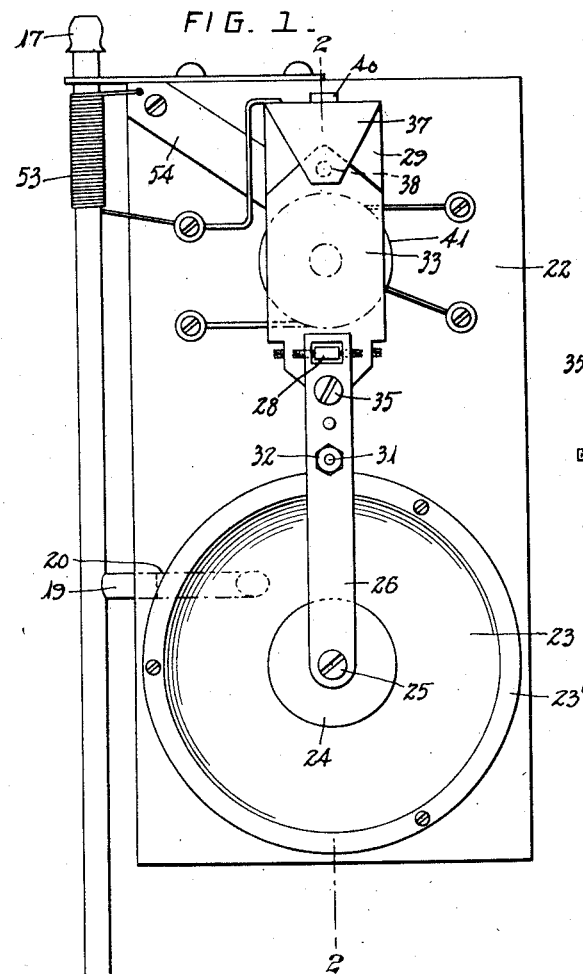
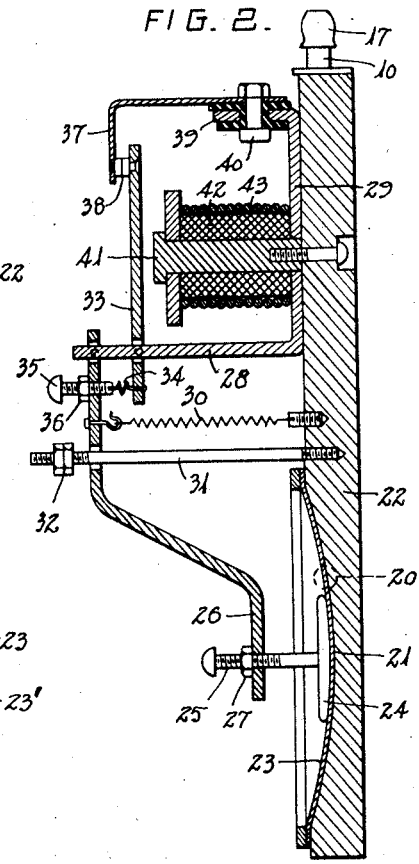
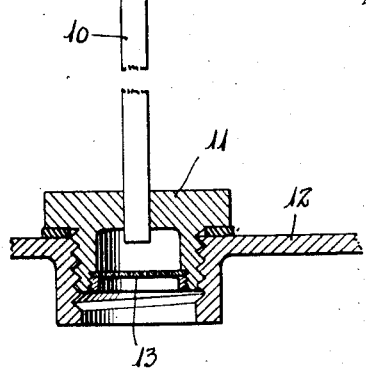
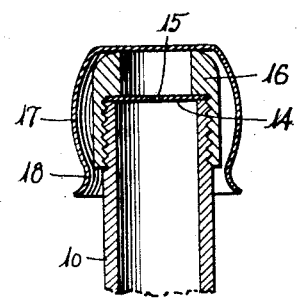
Inventor:
Leslie Lippard
By Monroe E. Miller
Attorney.

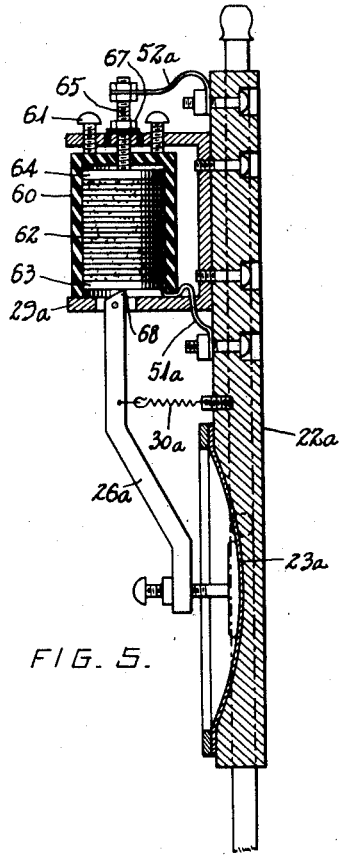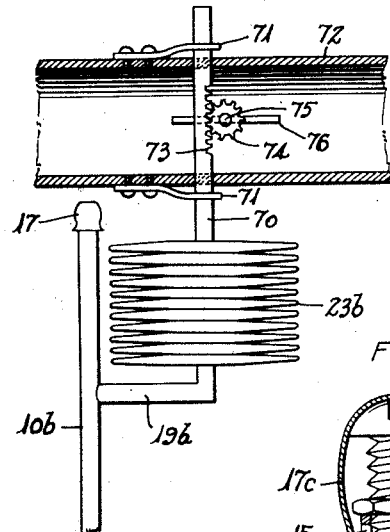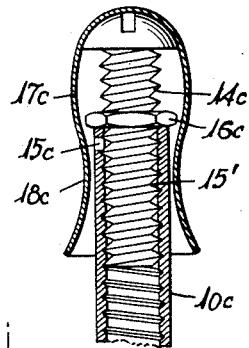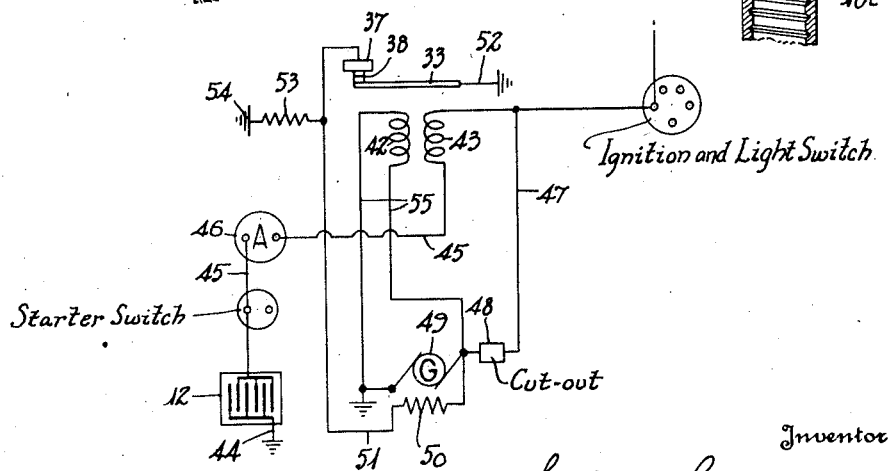

Patented Sept. 13, 1932

1,876,985

UNITED STATES PATENT OFFICE

LESLIE LIPPARD, OF SALIDA, COLORADO

BATTERY CHARGING SYSTEM

Application filed May 9, 1928. Serial No. 276,315.

The present invention relates to charging outfits or apparatus for storage or secondary batteries, and aims to provide a novel and improved equipment for controlling the charging of a storage battery according to the generation of gas in the battery, in order that the increase and decrease in the gas given off during the charging of the battery will automatically decrease and increase, respectively, the charging current, so as to provide more uniform charging operation and to avoid over-charging of and damage to the battery.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1 is a front view of the controlling device, showing a portion of the battery in section.

Fig. 2 is a section on the line 2—2 of Fig. 1.

Fig. 3 is an enlarged sectional detail of the discharge portion of the gas escape tube.

Fig. 4 is a diagrammatical view showing the electrical circuits.

Fig. 5 is a view corresponding with Fig. 2 showing a modification.

Fig. 6 is a view, partly in elevation and partly in section, of another modified form of the invention.

Fig. 7 is a sectional detail illustrating a modified form of gas outlet means.

In carrying out the invention a tube or pipe 10 has one end extending through the cap or plug 11 of the secondary or storage battery 12, for the escape of the gas from the battery through said tube. The cap 11 preferably has a screen or baffle 13 therein, to prevent the acid from spraying into the tube during the shaking of the battery, especially when used on automobiles, and has a tight gasket.

A disk or diaphragm 14 is disposed across the discharge end of the tube 10 and has a minute aperture 15 therein to permit a slight or restricted discharge of the gas according to a predetermined generation of gas in the battery when the battery is being charged at a normal or desired rate.

The disk 14 is secured in place by a shouldered cuff 16 screw-threaded on the end of the tube, as seen in Fig. 3, and a protecting cap 17 is slipped over the cuff 16. The cap has a restricted portion 18, which is resilient, to frictionally pass over the cuff 16 and beyond same when the cap is applied, thereby preventing accidental removal of the cap, although the cap is loose to permit the gas to escape. The cap prevents dust and other foreign matter entering the cup 16 and clogging the aperture 15.

The tube 10 has a branch 19 communicating with a bore 20 in a base or back 22, and said base has a concaved depression 21 to which the bore 20 extends. A diaphragm 23 is disposed across said depression, and its margin is clamped behind a ring 23' secured to the base around said depression. A pressure plate or disk 24 bears against the central portion of the diaphragm and is carried by a screw 25 screw-threaded in a lever 26, a lock nut 27 being disposed on said screw to bear against said lever. The lever is fulcrumed to a post 28 forming one end portion of a bar 29 secured to the base 22.

A spring 30 connects the lever 26 and base 22 to move the lever 26 toward the base. The outward movement of the lever 26 with the diaphragm 23 is limited by means of a rod 31 carried by the base 22 on which stop nuts 32 are mounted to limit the outward movement of said lever.

The outward movement of the lever 26 is used to influence a regulator which includes a lever 33 fulcrumed to the post 28 and connected by a compression spring 34 with an adjusting screw 35 threaded in the lever 26 and held in place by a lock nut 36 thereon. The regulator is of conventional form as shown, and has a bracket 37 secured by a bolt or binding post 40 to the outstanding terminal 39 of the bar or plate 29 opposite to the post 28, said bracket being insulated from said plate. The lever 33 and bracket 37 have cooperating contacts 38. When the diaphragm is forced outwardly by gas entering the depression 21 behind the diaphragm, the lever 26 is swung outwardly, thereby partly or entirely relieving the pressure of the spring 34 on the lever 33, in order to reduce the influence or pressure of the spring 34 and thereby decrease the charging rate.

The switch lever 33 of the regulator is controlled by an electromagnet 41 mounted on the plate 29, and having the shunt coil 42 and series coil 43 wound thereon, the lever 33 providing an armature to be attracted by the electromagnet for opening the electrical circuit at the contacts 38. This type of regulator is a combined potential and current regulator, the advantages of which are well known.

Referring to Fig. 4 showing the electrical circuits, one pole of the battery 12 is connected to ground, as at 44, and the other pole is connected by the conductor 45, which may have an ammeter 46 therein, with one terminal of the series coil 43 of the regulator, and the other terminal of said coil is connected by a conductor 47 through an automatic cut-out 48 with one terminal of the generator 49. The other terminal of the generator is grounded. The shunt field coil 50 is connected in circuit with the generator, a conductor 51 connected with the bracket 37, and the lever 33 which is grounded, as at 52. Resistance 53 is connected to the conductor 51 and to ground, as at 54, and as shown in Fig. 1 the resistance 53 may be an insulated wire wound on the tube 10. The shunt coil 42 of the regulator is connected by the wires 55 with the opposite terminals of the generator 49.

The normal charging circuit is traced as follows: 44, 12, 45, 46, 43, 47, 48 and 49. The shunt field circuit is traced as follows: 49, 50, 51, 37, 38, 33 and 52. The resistance 53 is alternately included in the circuit and shunted by the switch lever 33 when said lever vibrates as usual in regulators. The series coil 43 of the electromagnet 41 is energized in the charging circuit, while the shunt coil 42 is energized directly from the generator 49 in the shunt circuit 55. The lever or armature 33 is vibrated during the charging of the battery to regulate such charging, as well known, depending on the influence of the spring 34 as adjusted by the screw 35.

The outward movement of the diaphragm 23 occurs when the gas is generated at a faster rate in the battery than can escape through the aperture 15, the surplus gas flowing through the branch 19 into the depression 21 and forcing the diaphragm 23 outwardly. This will relieve the pressure on the spring 34, so that the armature lever 33 will yield more easily to the magnetic field of the coils 42 and 43. Consequently, the resistance 53 plays a greater part in controlling the shunt field coil 50 of the generator, to reduce the charging rate of the battery.

When the generation of gas in the battery is reduced, so that the gas can all escape through the aperture 15, the spring 30 restores the lever 26, and this increases the pressure on the spring 34, so as to increase the charging rate. The vibration of the armature lever 33 is therefore dependent not only on the field of the coils 42 and 43 of the regulator, but is also dependent on the rate of production of gas in the battery.

Should the occasion arise when it is essential to interrupt the charging current entirely, to prevent the accumulation of excessive gas pressure, this is accomplished by adjusting the stop nuts 32 on the rod 31, so that the lever 26 has just enough travel to relieve the spring 34 of practically all pressure.

The pressure need not be entirely removed, because the shunt coil 42 will hold the armature lever 33 open even though the spring 34 still exerts some pressure. The only time that the lever 33 will open under these conditions is when the battery is fully charged or in the event that the gas discharge outlet becomes obstructed. Supposing the battery is fully charged and the automobile has remained idle long enough for all pressure to leak off. Then when the engine is started, with the regulator set for maximum charging current, which may be ten or fifteen amperes, depending on the adjustment of the generator, for a short time the battery receives a heavy charging current and gas is generated at a higher rate, but it takes several moments for the gas to rise to the surface of the electrolyte and to fill the space above the electrolyte and in the tube 10 and cavity 21. By this time too much gas has been produced, and the excess gas forces the diaphragm 23 outwardly to the limit of travel of the lever 26, and interrupts the charging current until sufficient pressure leaks off to determine a definite charging rate.

Fig. 5 illustrates a control device employing variable resistance. The lever 26a which is operated by the diaphragm 23a is pivoted near one end to one arm of a U-shaped bracket 29a secured to the base 22a.

A case 60 of insulating material has an open end bearing against said arm of the bracket 29a and is clamped against said arm by screws 61 threaded through the other arm of said bracket and bearing against the closed end of said case. Within the case is a pack 62 of disks composed of carbon or other similar material, sandwiched between the metal disks 63 and 64. The disk 64 is carried by adjusting screw 65 threaded through the upper arm of the bracket 29a, and held by a lock nut 67 thereon. The lever 26a has a short arm or cam 68 contacting with the disk 63 which will move the disk 63 upwardly, by the influence of the spring 30a, in order to compress the pack 62 and decrease the electrical resistance thereof, the wire 51a leading from the field coil of the generator and corresponding with the wire 51 in Fig. 4, being connected to the disk 63, and the wire 52a leading to the ground being connected with the adjusting screw 65. The resistance pack 62 may thus be located between the generator field coil and ground or may be connected in the battery charging circuit with a suitable rectifier or constant potential generator. When the diaphragm 23a is forced outwardly by the gas, the lever 26a is swung outwardly and the cam 68 is retracted so as to loosen the pressure on the pack 62 and thereby increase the resistance in the circuit.

The charging rate is thus decreased in proportion to the amount of excessive gas generated in the battery, and when the gas escapes the spring 30a restores the lever 26a and compresses the pack 62 so as to decrease the resistance and increase the charging rate. This type of device is best suited for generators running at constant speeds, whereas the device shown in Figs. 1 and 2 is suitable for establishing a smooth flow of charging current under varying generator speeds such as occurs with automobile generators.

Fig. 6 shows the branch 19b of the tube 10b connected with a metal bellows 23b, and having a bar 70 at its free portion slidable in guides 71, on the exterior of the intake conduit 72 of an internal combustion engine which drives a generator for charging the battery. The bar 70 has rack teeth 73 meshing with a pinion 74 on a shaft or stem 75 carrying a throttle valve 76 within said conduit.

The throttle valve 76 is normally open, as seen in Fig. 6; when the gas can escape without accumulation in the bellows 23b, but when the production of gas is excessive, the bellows 23b is expanded, thereby sliding the rack bar 70 and turning the pinion 74 so as to move the valve 76 toward closed position, thereby throttling down the engine and decreasing the speed of the generator accordingly. The speed of the engine and generator may thus be reduced when the battery gases excessively.

In practice, it is desirable that the battery be maintained at the gassing point in order to obtain the best efficiency in charging, and if the battery is to be charged in the shortest possible time. Slight gassing does not injure the battery, but excessive gassing or violent production of gas becomes harmful, due to the overheating of the battery, buckling of the plates, loosening of the active material, and breaking down of the separators. The battery will also evaporate off the water too rapidly, thereby causing the electrolyte to become too strong. Furthermore, overcharging results in the gas bubbles increasing the resistance of the battery and its circuit, resulting in overloading other circuits energized from the generator, which has resulted in lamps and other electrical devices being burned out. By holding down the gassing of the battery to a predetermined rate, determined by the size of the discharge aperture 15, the benefits above noted and others are obtained.

Fig. 7 illustrates adjustable gas discharge means, by means of which the rate of discharge of the gas may be readily regulated. A screw 14c is threaded into the terminal of the gas tube 10c, with a clearance between the base of the thread and the wall of the tube 10c, so as to provide a spiral passage 15' communicating with a vent aperture 15c in the tube 10c.

A lock nut 16c is threaded on the screw to bear against the end of the tube in order to maintain the adjustment of the screw, and a dust cap 17c is disposed over the screw and terminal of the tube. The cap has a contracted portion 18c to move frictionally past the lock nut 16c, to prevent the accidental loss of the cap. It is apparent that by adjusting the screw 14c inwardly and outwardly this will increase and decrease the resistance to the discharge of gas from the tube, inasmuch as the spiral passage 15' becomes longer and shorter as the screw is threaded into and unscrewed from the tube. The nut 16c also closes the end of the tube 10c and draws the screw 14c outwardly so that its thread seats tightly in the groove of the tube.

If a hard rubber or other semi-elastic tube 10c is employed, the screw 14c may be forced frictionally into the tube by a sliding movement, for purpose of adjustment, without screw-threading the screw in the tube.

Having thus described the invention, what is claimed as new is:—

1. An apparatus of the character described comprising a generator, a storage battery, a circuit including said generator and battery, controlling means for reducing the charging current in said circuit, a series coil in said circuit and a shunt coil connected with the generator and both controlling the first named means, means operable by accumulated gas from the storage battery and yieldably controlling the first named means jointly with the second named means.

2. An apparatus of the character described comprising a generator, a storage battery, a circuit including the generator and battery, controlling means for reducing the charging current in said circuit, means energized from the generator and controlling the first-named means, means operable by accumulated gas from the storage battery, and a yieldable connection between the first-named and third-named means and coupled thereto.

3. An apparatus of the character described comprising a generator, a storage battery, a circuit including the generator and battery, means including a controlling member for reducing the charging current in said circuit, a series coil in said circuit and a shunt coil connected with the generator both controlling said member, means operable by accumulated gas from the battery, and a yieldable connection between the thirdnamed means and said member.

4. An apparatus of the character described comprising means including a battery charging circuit having a generator therein, a controlling member for controlling the current flow through said battery charging circuit, a series coil to be disposed in said circuit and a shunt coil to be energized by the charging generator both controlling said member, means adapted to be operated by accumulated gas from the storage battery, and a yieldable connection between said member and second-named means.

5. An apparatus of the character described comprising a generator, a storage battery, a circuit including said battery and generator, and members having a yieldable connection and operable for reducing the charging current, one member being controlled by current generated by said generator and the other member being controlled by gas produced in the battery.

6. An apparatus of the character described comprising a battery charging circuit having a generator therein, means for controlling the current flow in said battery charging circuit, means adapted to be energized by the charging of said generator, means adapted to be operated by accumulated gas from a storage battery, and means controlled by the second named and third named means and including a yieldable connection between them and controlling the first named means and coupled thereto.

In testimony whereof I hereunto affix my signature.

LESLIE LIPPARD.